United States Patent
Yoder

(10) Patent No.: US 7,426,622 B2
(45) Date of Patent: *Sep. 16, 2008

(54) RAPID LOCALITY SELECTION FOR EFFICIENT MEMORY ALLOCATION

(75) Inventor: Michael E. Yoder, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 516 days.

This patent is subject to a terminal disclaimer.

(21) Appl. No.: 10/798,710

(22) Filed: Mar. 10, 2004

(65) Prior Publication Data

US 2005/0204114 A1     Sep. 15, 2005

(51) Int. Cl.
*G06F 12/00* (2006.01)
(52) U.S. Cl. .................. 711/170; 711/203; 718/104
(58) Field of Classification Search .................. 711/170
See application file for complete search history.

(56) References Cited

U.S. PATENT DOCUMENTS

| | | | |
|---|---|---|---|
| 5,630,088 A | | 5/1997 | Gupta et al. |
| 6,023,281 A | * | 2/2000 | Grigor et al. ................ 345/543 |
| 6,125,433 A | * | 9/2000 | Horstmann et al. ......... 711/160 |
| 6,272,612 B1 | * | 8/2001 | Bordaz et al. ................ 711/203 |
| 6,505,286 B1 | * | 1/2003 | Kingsbury et al. .......... 711/170 |
| 6,598,130 B2 | | 7/2003 | Harris et al. |
| 6,701,421 B1 | * | 3/2004 | Elnozahy et al. ............ 711/170 |
| 6,785,888 B1 | * | 8/2004 | McKenney et al. ......... 718/104 |
| 2004/0019891 A1 | * | 1/2004 | Koenen ....................... 718/102 |
| 2004/0064655 A1 | * | 4/2004 | Paulraj ....................... 711/154 |

OTHER PUBLICATIONS

Microsoft Computer Dictionary, 5th Edition, 2002, Microsoft Press, pp. 280.*
B.C. Brock, et al., "Experience with building a commodity Intel-based ccNUMA system", Mar. 2001, pp. 207-227, IBM J. Res. & Dev. vol. 45 No. 2.
HP-UX Memory Management White Paper Version 1.3, Apr. 7, 1997, pp. 1-112, Copyright 1997, Hewlett-Packard Company.

* cited by examiner

*Primary Examiner*—Kevin Ellis
*Assistant Examiner*—Matthew Bradley

(57) ABSTRACT

One embodiment disclosed relates to a method of selecting a physical memory locality in a multiprocessor system. A data structure including sets of equidistant localities is provided. A preferred locality is determined using a pointer to a locality within said data structure. Other embodiments disclosed relate to the multiprocessor computing system, the operating system for the multiprocessor computing system, and the data structure for use in selecting a physical memory locality.

16 Claims, 9 Drawing Sheets

Method 800

Method 800

RAPID LOCALITY SELECTION FOR EFFICIENT MEMORY ALLOCATION

BACKGROUND OF THE INVENTION

1. Field of the Invention

The present invention relates generally to memory management in computing systems.

2. Description of the Background Art

Conventionally, a multiprocessing system is a computer system that has more than one processor, and that is typically designed for high-end workstations or file server usage. The performance of a multiprocessing system is not necessarily improved by simply increasing the number of processors in the multiprocessing system. This is because the continued addition of processors past a certain saturation point serves merely to increase communication bottlenecks and thereby limit the overall performance of the system. Thus, although conceptually simple, the implementation of a parallel computing system is in fact very complicated, involving tradeoffs among single-processor performance, processor-to-processor communication performance, ease of application programming, and managing costs.

Parallel computing embraces a number of computing techniques that can be generally referred to as "multiprocessing" techniques. There are many variations on the basic theme of multiprocessing. In general, the differences are related to how independently the various processors operate and how the workload among these processors is distributed.

Two common multiprocessing techniques are symmetric multiprocessing systems ("SMP") and distributed memory systems. One characteristic distinguishing the two lies in the use of memory. In an SMP system, high-speed electronic memory may be accessed, i.e., shared, by all the CPUs in the system. In a distributed memory system, none of the electronic memory is shared among the processors. In other words, each processor has direct access only to its own associated fast electronic memory, and must make requests to access memory associated with any other processor using some kind of electronic interconnection scheme involving the use of a software protocol. There are also some "hybrid" multiprocessing systems that try to take advantage of both SMP and distributed memory systems.

SMPs can be much faster, but at higher cost, and cannot practically be built to contain more than a modest number of CPUs, e.g, a few tens. Distributed memory systems can be cheaper, and scaled arbitrarily, but the program performance can be severely limited by the performance of the interconnect employed, since it (for example, Ethernet) can be several orders of magnitude slower than access to local memory.

In a hybrid system, multiple CPUs are usually grouped, or "clustered," into cells. These cells may be referred to as SMP nodes. Shared memory is distributed across the SMP nodes, with each SMP node including at least some of the shared memory. The shared memory within a particular node is "local" to the CPUs within that node and "remote" to the CPUs in the other nodes. One drawback with hybrid systems lies in bottlenecks encountered in retrieving data. Because of the hardware involved and the way it operates, data transfer between a CPU and the local memory can be, for example, 10 to 100 times faster than the data transfer rates between the CPU and the remote memory. Consequently, the problem of how to expose the maximum available performance to the applications programmer is an interesting and challenging exercise. This problem is exacerbated by the fact that most parallel programming applications are developed for either pure SMP systems or for pure distributed memory systems.

One specific type of hybrid multiprocessing system utilizes a cache-coherent non-uniform memory architecture (ccNUMA). A typical design for a ccNUMA system uses several SMP systems as computing nodes and connects them with a cache-coherent switch that supports shared memory across all the processors.

SUMMARY

One embodiment of the invention relates to a method of selecting a physical memory locality in a multiprocessor system. A data structure including sets of equidistant localities is provided. A preferred locality is determined using a pointer to a locality within said data structure.

Another embodiment relates to a multiprocessor computing system. The system includes multiple symmetric multiprocessing (SMP) nodes, multiple central processing units (CPUs) at each SMP node, and a memory control unit at each SMP node which is coupled to each CPU at that SMP node. Shared memory at each SMP node is accessible by way of the memory control unit at that SMP node, and a switching system coupled to the memory control units so as to interconnect the multiple SMP nodes. An operating system runs on the CPUs and includes a virtual memory (VM) fault handler and a VM locality module. The VM locality module determines a preferred locality using a pointer to a locality within a data structure of physical memory localities.

Another embodiment relates to a data structure for use in selecting a physical memory locality in a multiprocessor system. The data structure is configured in accordance with a search policy. The data structure comprises multiple sets of equidistant physical memory localities under the search policy.

Another embodiment relates to an operating system for a multiprocessor computing system. The operating system includes a virtual memory manager, a virtual memory fault handler, and a virtual memory locality module. The virtual memory manager is configured to extend a memory space beyond limits of a physical address space. The virtual memory locality module is configured to rapidly select a physical memory locality in the system. The virtual memory fault handler is configured to interrupt execution of the virtual memory manager when a page fault occurs and to utilize the virtual memory locality module to determine the physical memory locality from which to allocate memory in response to the page fault.

DETAILED DESCRIPTION

The following discussion describes one or more embodiments of the invention. In the interest of clarity, not all features of an actual implementation are described in this specification. It will be appreciated that, in the development of any such actual embodiment, numerous implementation-specific decisions must be made to achieve the developers' specific goals. Such details might include compliance with system-related and business-related constraints, which will vary from one implementation to another, for instance. Moreover, it will be appreciated that such a development effort, even if complex and time-consuming, would be a routine undertaking for those of ordinary skill in the art having the benefit of this disclosure.

Figure 1:
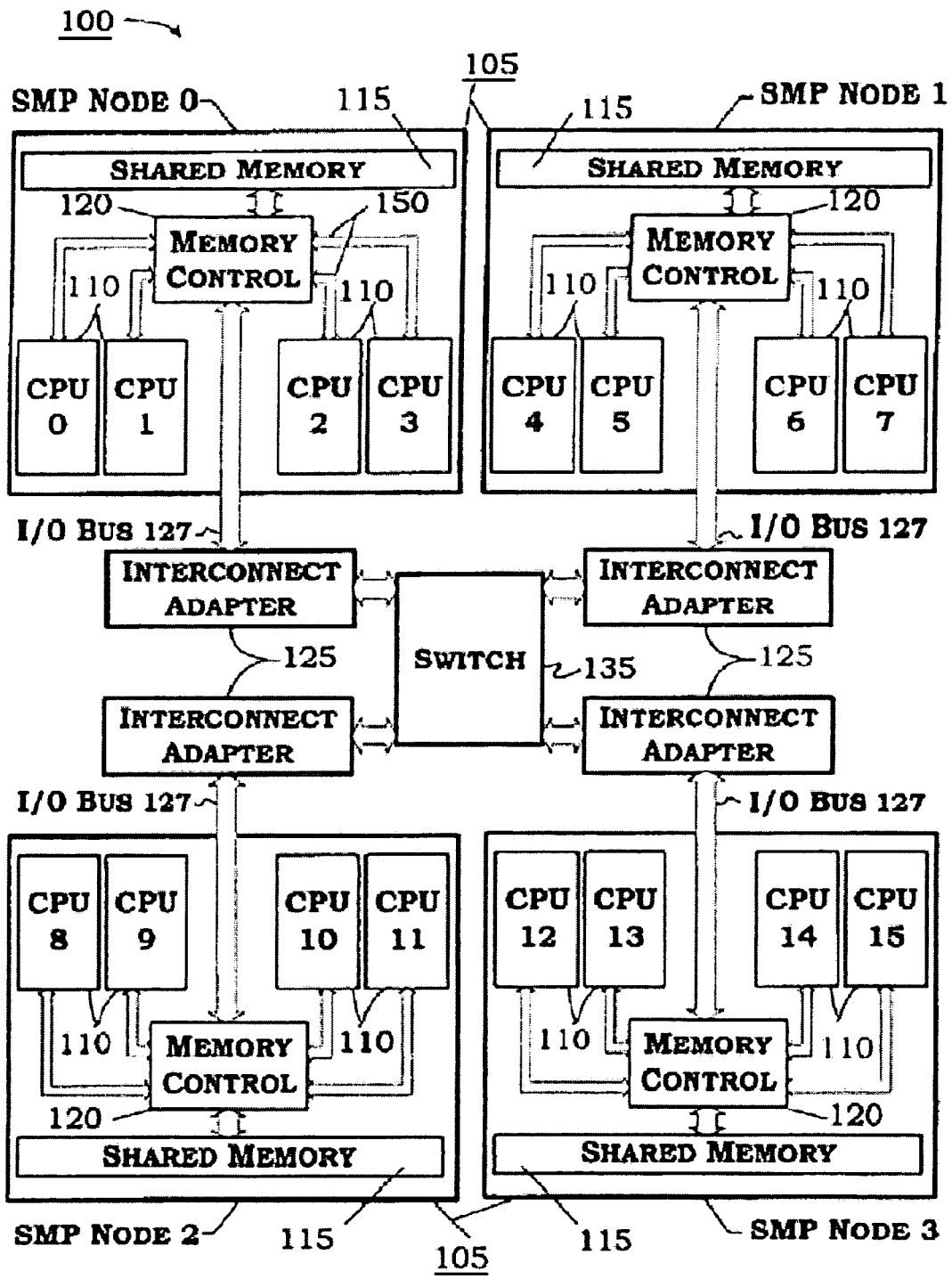
FIG. 1 is a schematic diagram of an example computing system within which the invention may be embodied.

FIG. 1 is a schematic diagram of an example computing system 100 within which the invention may be embodied. The computing system 100 is, in this particular embodiment, a hybrid computing system exhibiting characteristics of both an SMP computing system and a distributed memory computing system. The computing system 100 may comprise a ccNUMA type system. The computing system 100 comprises a plurality of SMP nodes 105. Each SMP node 105 may also be referred to as a "cell". Each SMP node 105 includes a plurality of CPUs 110 connected to a common shared memory system 115 via a memory control unit 120. Each memory control unit 120 also allows access, via an input/output ("I/O") bus 127, to an interconnect adapter 125. The interconnect adapters 125 allow each SMP node 105 to communicate with the switch 135 to access memory locations on the other SMP nodes 105 in the computing system 100. The switch 135 may comprise a cross-bar type switch and may include cache-coherent features.

The CPUs 110 of each SMP node 105 communicate over a bus 150. The information on the buses 150 flows at higher rates and with lower latencies, than the information flowing on the I/O bus 127 and through the switch 135. Typically, local accesses via the local memory controller 120, are roughly ten to one hundred times faster than memory accessed via the switch 135 or even the interconnect adapters 125. Thus, it is highly desirable to access data from the shared memory 115 within the same SMP node 105 through the local memory controller 120 rather than from a remote memory in another SMP node 105.

The computing system 100 may employ any suitable operating system ("OS") to control and direct its operations. One particular implementation employs the HP-UX OS available from the Hewlett Packard Company. However, the invention is not so limited to that particular OS. In accordance with an embodiment of the invention, the operating system supports multi-threaded processes.

The computing system 100 is but one hardware implementation that may be configured and operated in accordance with the present invention. The diagram shows four SMP nodes, each directly connected to a single switch for simplicity, but many other configurations of SMP nodes and switches are possible, including configurations with two, four, eight, sixteen, thirty-two or even hundreds of processors and multiple switches. Likewise, the SMP nodes 105 may include more, or fewer, CPUs 110. Thus, the computing system 100 is but one example, and many other hardware implementations may be employed.

Figure 2:
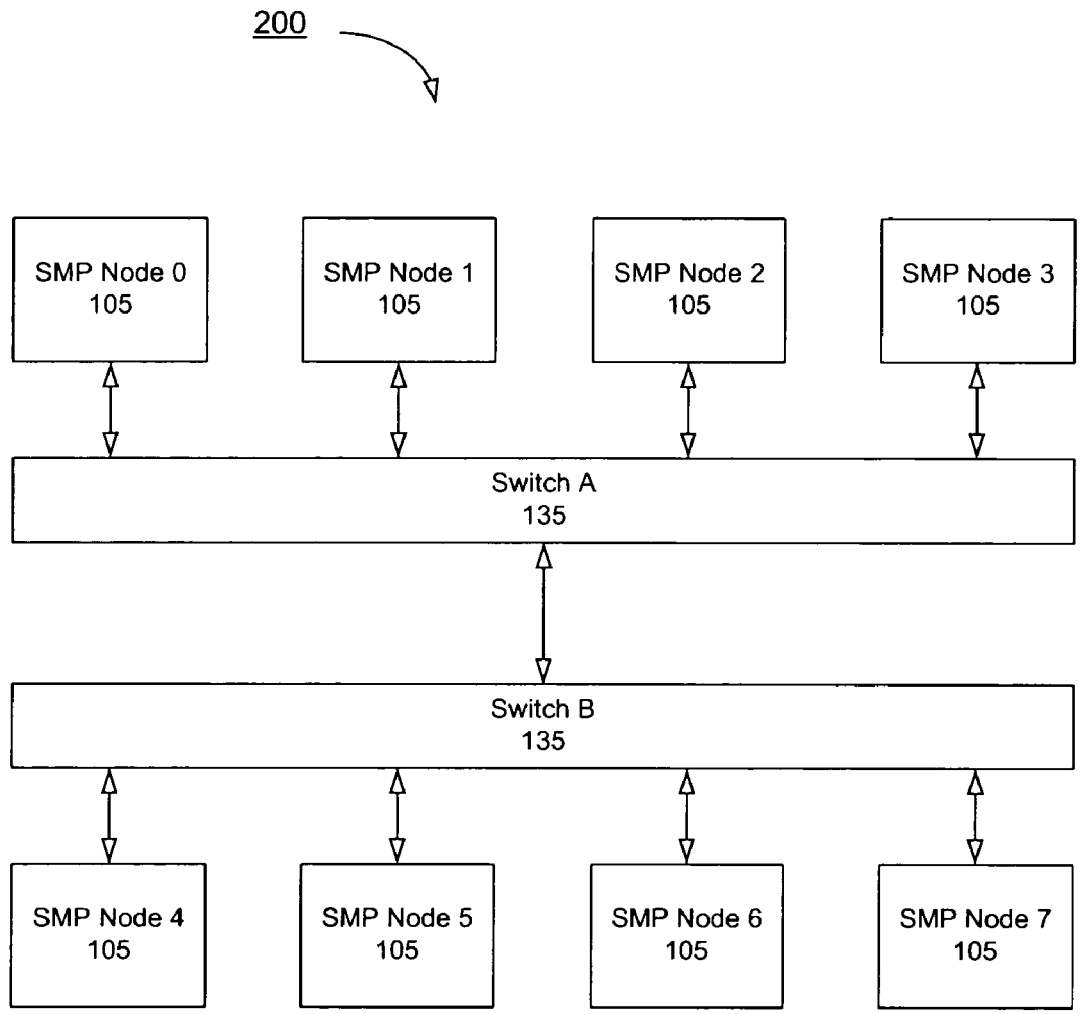
FIG. 2 is a schematic diagram of another example computing system within which the invention may be embodied.

FIG. 2 is a schematic diagram of another example computing system 200 within which the invention may be embodied. This example system 200 includes eight SMP nodes 105. Four of the SMPs 105 (Nodes 0, 1, 2, and 3) are interconnected by way of a first switch 135 (Switch A). The other four SMPs 105 (Nodes 4, 5, 6, and 7) are interconnected by way of a second switch 135 (Switch B). The first and second switches are interconnected with each other. Note that additional components are also present in the system 200, though they are not explicitly shown for purposes of clear explanation of the inventive concepts herein.

Figure 3:
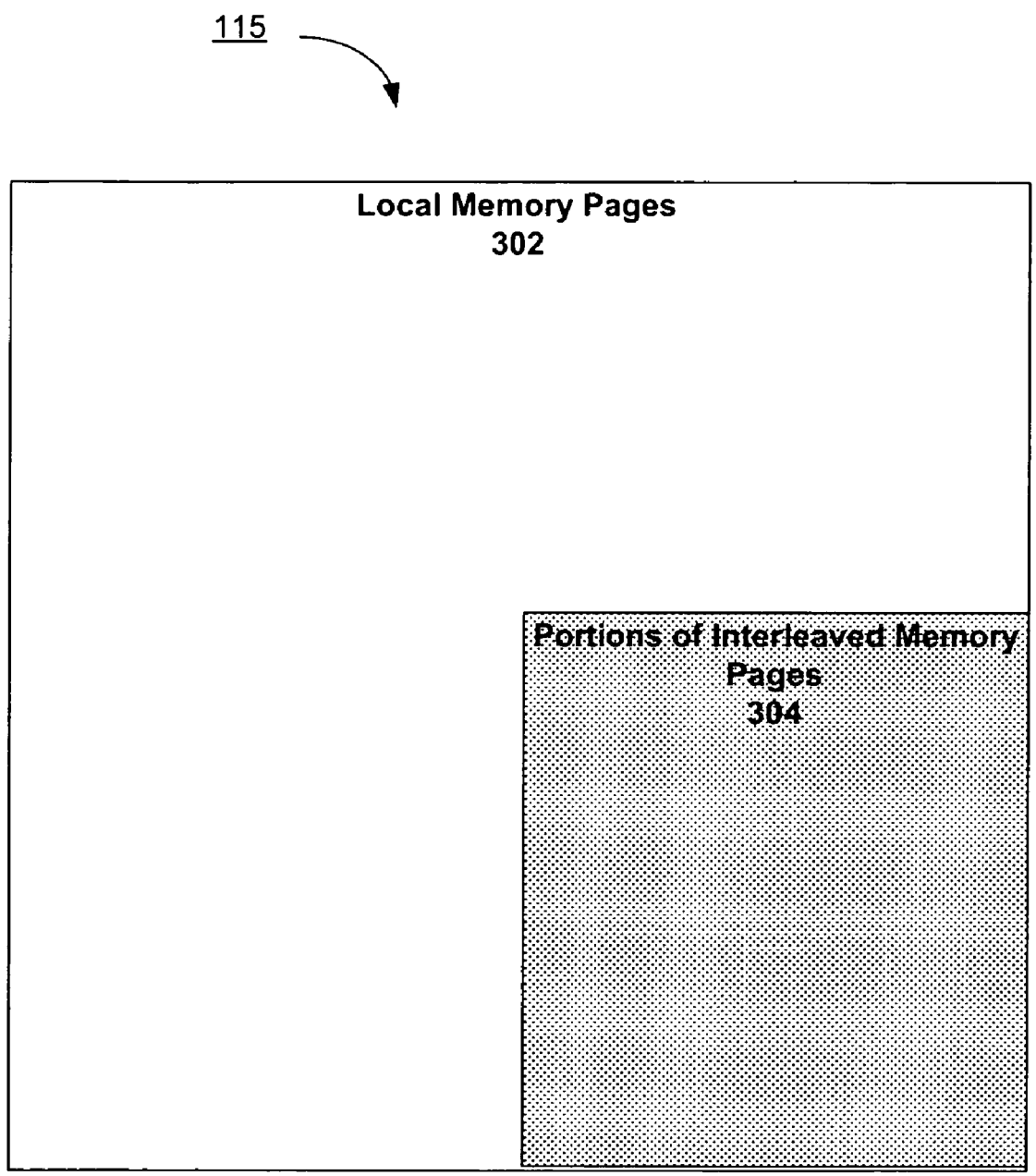
FIG. 3 is a diagram depicting shared memory including both local memory pages and interleaved memory pages in accordance with an embodiment of the invention.

FIG. 3 is a diagram depicting shared memory 115 including both local memory pages 302 and interleaved memory pages 304 in accordance with an embodiment of the invention. Shared memory pages 115 at each SMP node 105 may be of two types. A first type is a local memory page 302, and a second type is an interleaved memory page 304. The amount of each type may be configurable by the operating system. A local memory page 302 resides entirely at one SMP node 105. In contrast, an interleaved memory page 304 is divided such that it resides on multiple SMP nodes. For example, in FIG. 1, a first stripe of an interleaved page 304 may reside at Node 0, a second stripe of the page may be at Node 1, a third stripe of the page may be at Node 2, a fourth stripe of the page may be at Node 3, then back again, such that a fifth stripe of an interleaved page 304 may reside at Node 0, a sixth stripe of the page may be at Node 1, a seventh stripe of the page may be at Node 2, an eighth stripe of the page may be at Node 3, and so on. In other words, interleaved memory may comprise a hardware-implemented block of physical memory that includes a fine-grained mix of memory from more than one node.

The local memory pages 302 may be categorized into different locality levels based upon its location in the system relative to a particular CPU. A local memory page is at the closest locality level is when the page is at a same SMP node as the pertinent CPU. A local memory page is at the second closest locality level is when the page is at a neighboring SMP node which is reachable via a single intervening switch. A local memory page is at the third closest locality level is when the page is at an SMP node which is reachable via two intervening switches. And so on. For example, consider the CPU 1 in the system 100 of FIG. 1. CPU 1 is located at SMP Node 0. With respect to CPU 1, the closest locality level comprises the local memory pages also at SMP Node 0. The second closest locality level comprises the local memory pages at any of SMP Nodes 1, 2, or 3. As another example, consider SMP Node 5 in the system 200 of FIG. 2. With respect to SMP Node 5, the closest locality level comprises the local memory pages also at SMP Node 5. The second closest locality level comprises the local memory pages at any of SMP Nodes 4, 6, and 7. The third closest locality level comprises the local memory pages at any of SMP Nodes 0, 1, 2, and 3. When interleaved memory is present, the interleaved memory may also comprise a locality.

Figure 4:
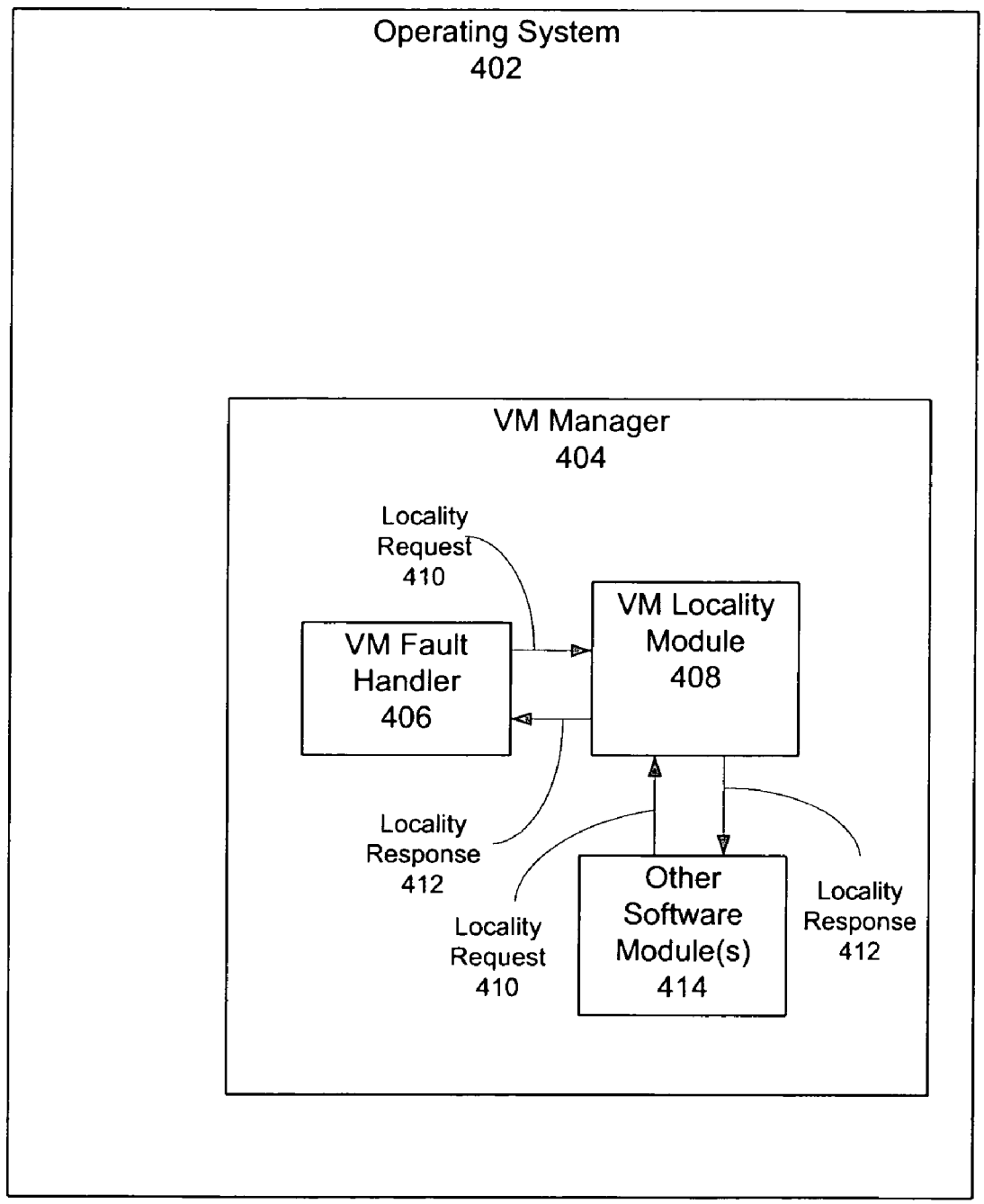
FIG. 4 is a diagram depicting select software components of a system in accordance with an embodiment of the invention.

FIG. 4 is a diagram depicting select software components of a system in accordance with an embodiment of the invention. The system software includes an operating system 402 that runs on each of the CPUs. The operating system 402 includes various modules, including a virtual memory manager 404. The virtual memory (VM) manager 404 provides for the memory space to be extended beyond the limits of the physical address space. The VM manager 404 includes, among other modules, a VM fault handler 406. Because the memory space is divided into pages, the VM fault handler 406 may also be called a page fault handler.

When a CPU desires to access a memory address, the desired memory address is presented to the VM manager 404. The VM manager 404 checks to see if it has a translation for this memory address into a physical address. If the VM manager 404 does not have a translation for this memory address, then it interrupts the CPU and causes the VM fault handler 406 to be executed. The VM fault handler 406 determines a resolution for the page fault.

In accordance with an embodiment of the invention, the VM fault handler 406 is configured to utilize a VM locality module 408 to determine the locality of the physical memory to be allocated in resolution of such a page fault. The VM locality module 408 advantageously provides a rapid locking-free method of locality selection. Generally, locality request messages 410 are sent to the VM locality module 408, and the VM locality module 408 returns locality response messages 412. Such request and response messages may also be exchanged between the VM locality module 408 and other modules 414 (in addition to the VM fault handler 406).

Figure 5:
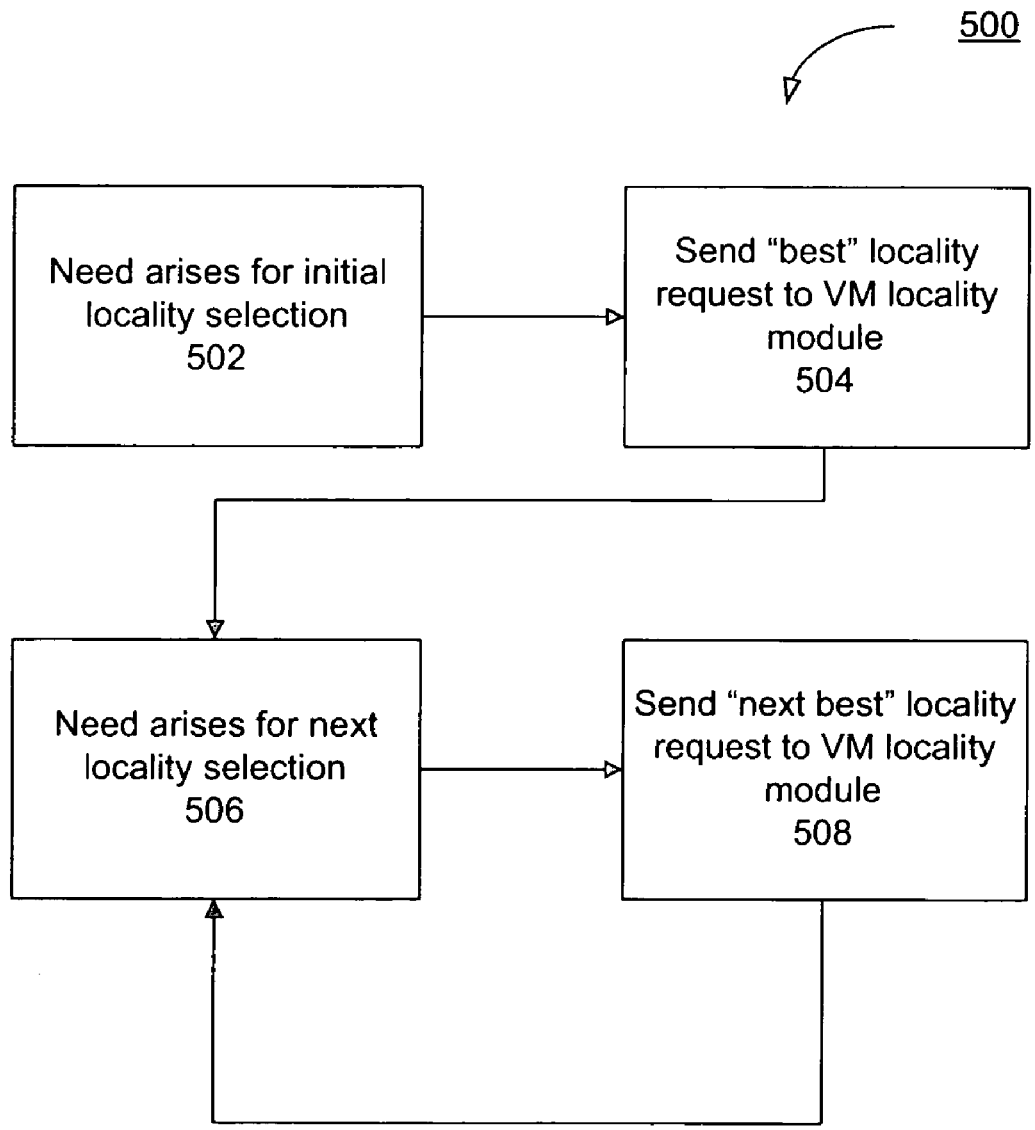
FIG. 5 is a flow chart depicting a process flow for requests to a virtual memory (VM) locality module in accordance with an embodiment of the invention.

FIG. 5 is a flow chart depicting a process flow for requests to a VM locality module in accordance with an embodiment of the invention. At the VM fault module 406 (or other module 414), a need arises 502 for an initial locality selection. For example, to deal with a page fault by the VM manager 404, the VM fault module 406 may need to allocate one or more pages of physical memory. The VM fault module 406 then sends 504 a "best" locality request to the VM locality module 408. In accordance with an embodiment of the invention, the best locality request includes locality searching parameters. In one embodiment, some of the parameters may be passed using a set of flags. The set of flags may include a flag or flags to indicate the search policy to be applied. In one example, the search policy may be an "interleaved first" policy. Such an interleaved first policy is discussed further below in relation to FIG. 6. In another example, the search policy may be a "closest first" policy. Such a closest first policy is discussed further below in relation to FIG. 7. Other policies may also be used. The parameters passed may also include a flag indicating whether the search policy is mandatory or advisory. In certain cases, the parameters passed may also include a desired locality, if any. The response of the VM locality module 408 to the "best" locality request is discussed further below in relation to FIG. 8.

Subsequently, a need may arise 506 for a next locality selection. For example, to deal with another page fault by the VM manager 404, the VM fault module 406 may need to allocate one or more additional pages of physical memory. The VM fault module 406 then sends 508 a "next best" locality request to the VM locality module 408. The response of the VM locality module 408 to the "next best" locality request is discussed further below in relation to FIG. 8.

Figure 6:
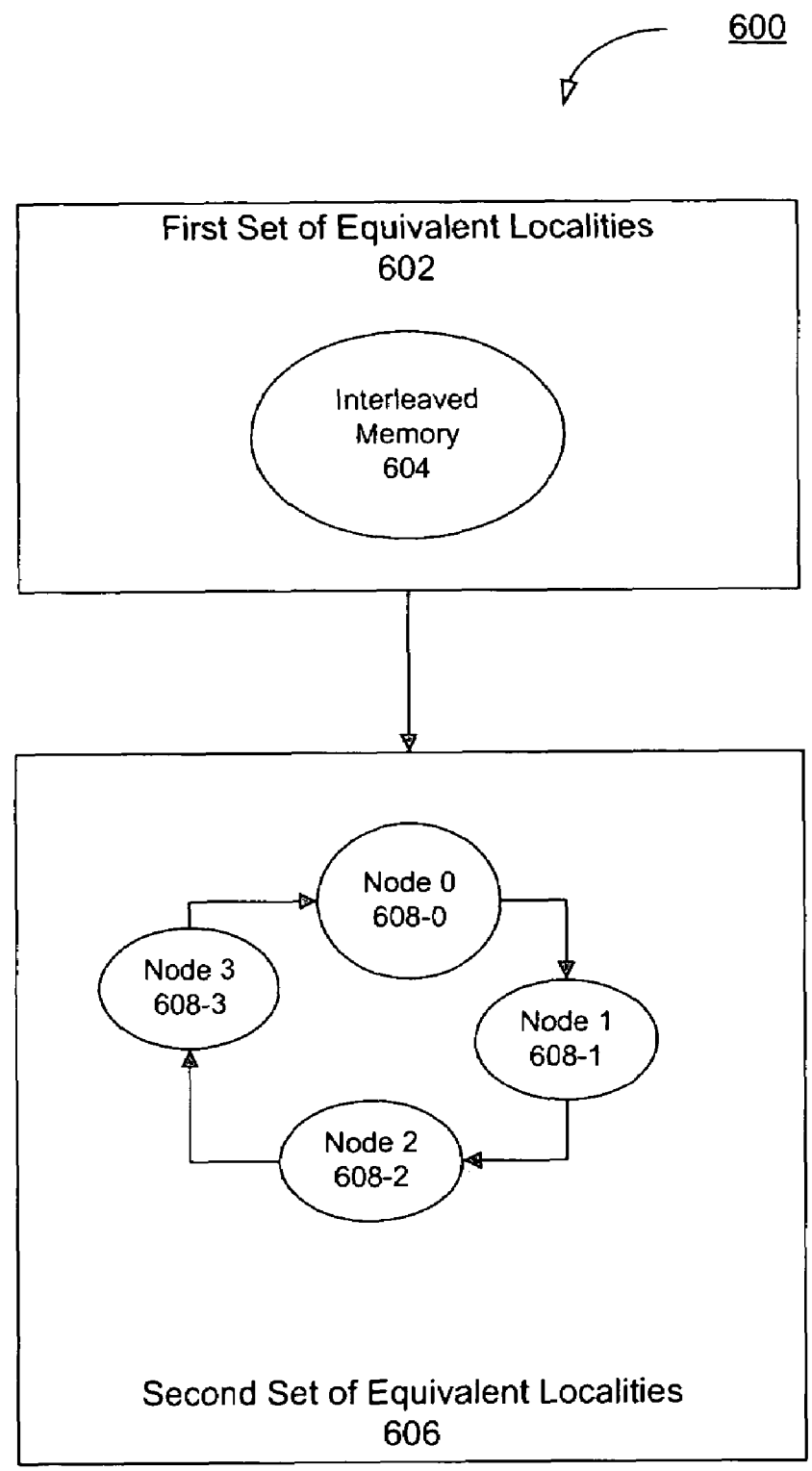
FIG. 6 is an example diagram depicting an example iterator structure under an "interleaved first" policy in accordance with an embodiment of the invention.

FIG. 6 is an example diagram depicting an example iterator structure 600 under an "interleaved first" policy in accordance with an embodiment of the invention. The particular iterator structure 600 shown in FIG. 6 relates to the system of FIG. 1 under the aforementioned interleaved first policy. As discussed further below in relation to FIG. 8, such an iterator data structure 600 may be utilized by the VM locality module 408 to select the locality to return to the calling routine.

The iterator structure 600 of FIG. 6 comprises sets of equivalent localities and states therein under the interleaved first policy. In this case, a first set 602 of equivalent localities includes an interleaved memory state 604, and a second set 606 of equivalent localities includes four local memory states 608. The four local memory states 608 correspond to the four SMP nodes 105 in the system of FIG. 1.

The first set 602 of equivalent localities comprises the preferred localities under the specified search policy. In this instance, the specified search policy is an interleaved first policy. Hence, the first set 602 of equivalent localities comprises an interleaved memory state 604.

The second set 606 of equivalent localities comprises the next preferred localities under the specified search policy. After interleaved memory, the next preferred locality comprises local memory at any of the SMP nodes 105. Hence, the second set 606 of equivalent localities comprises the local memory states 608. In this example, the local memory states 608 are arranged in a ring to denote a round-robin selection policy among the states.

Figure 7:
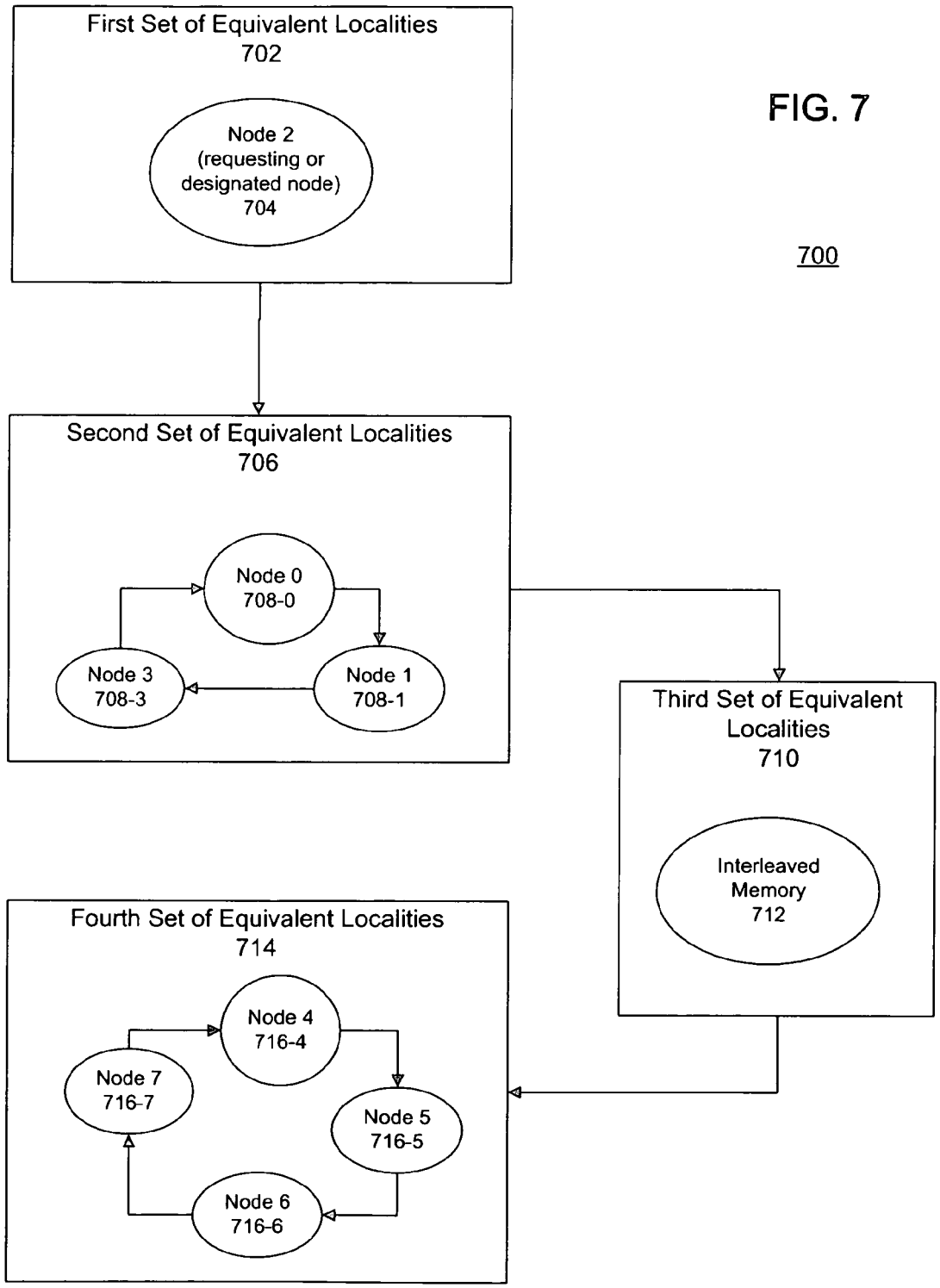
FIG. 7 is an example diagram depicting an example iterator structure under a "closest first" policy in accordance with an embodiment of the invention.

FIG. 7 is an example diagram depicting an example iterator structure 700 under a "closest first" policy in accordance with an embodiment of the invention. The particular iterator structure 700 shown in FIG. 7 relates to the system of FIG. 2 under the aforementioned closest first policy. As discussed further below in relation to FIG. 8, such an iterator data structure 700 may be utilized by the VM locality module 408 to select the locality to return to the calling routine.

There may be different embodiments of a closest first policy. In one embodiment, the closest first policy indicates that local memory closest to the requesting node is preferred. In another embodiment, a preferred node may be designated, and the closest first policy may indicate that local memory closest to the designated node is preferred.

The iterator structure 700 of FIG. 7 comprises sets of equivalent localities and states therein under the closest first policy. The first set 702 of equivalent localities comprises the most preferred locality or localities. In this case, the first set 702 of equivalent localities includes the local memory state 704 for the requesting or designated node. For purposes of discussion, consider the example where SMP Node 2 in FIG. 2 is the requesting or designated node.

A second set 706 of equivalent localities includes three local memory states 708. The three local memory states 708 correspond to the three nodes 105 that are nearest neighbors to the requesting or designated node. The three nodes 105 are nearest neighbors in that they are reachable from the requesting or designated node by way of only one switch 135 (Switch A). In the example where Node 2 in FIG. 2 is the requesting or designated node, then the three nearest neighbor nodes would be Nodes 0, 1, and 3 in FIG. 2. In this instance, the local memory states 708 are arranged in a ring to denote a round-robin selection policy among the states.

A third set 710 of equivalent localities comprises an interleaved memory state 712. The interleaved memory state 712 corresponds to the interleaved memory 304 that is spread through the various nodes 105 in the system 200 of FIG. 2.

A fourth set 714 of equivalent localities includes four local memory states 716. The four local memory states 716 correspond to the four nodes 105 that are next-nearest neighbors to the requesting or designated node. The four nodes 105 are next-nearest neighbors in that they are reachable from the requesting or designated node by way of two switches 135 (Switches A and B). In the example where Node 2 in FIG. 2 is the requesting or designated node, then the four nearest neighbor nodes would be Nodes 4, 5, 6, and 7 in FIG. 2. In this instance, the local memory states 716 are arranged in a ring to denote a round-robin selection policy among the states.

In this example, the interleaved memory 304 is, in terms of average access path, farther from the requesting or designated node than the nearest neighbor nodes 105 in the second set 706, and closer to the requesting or designated node than the next-nearest neighbor nodes 105 in the fourth set 714. In other words, it takes a shorter time to access the local memory of the nearest neighbor nodes than it takes, on average, to access the interleaved memory, and it takes a longer time to access the local memory of the next-nearest neighbor nodes than it takes, on average, to access the interleaved memory.

Figure 8A:
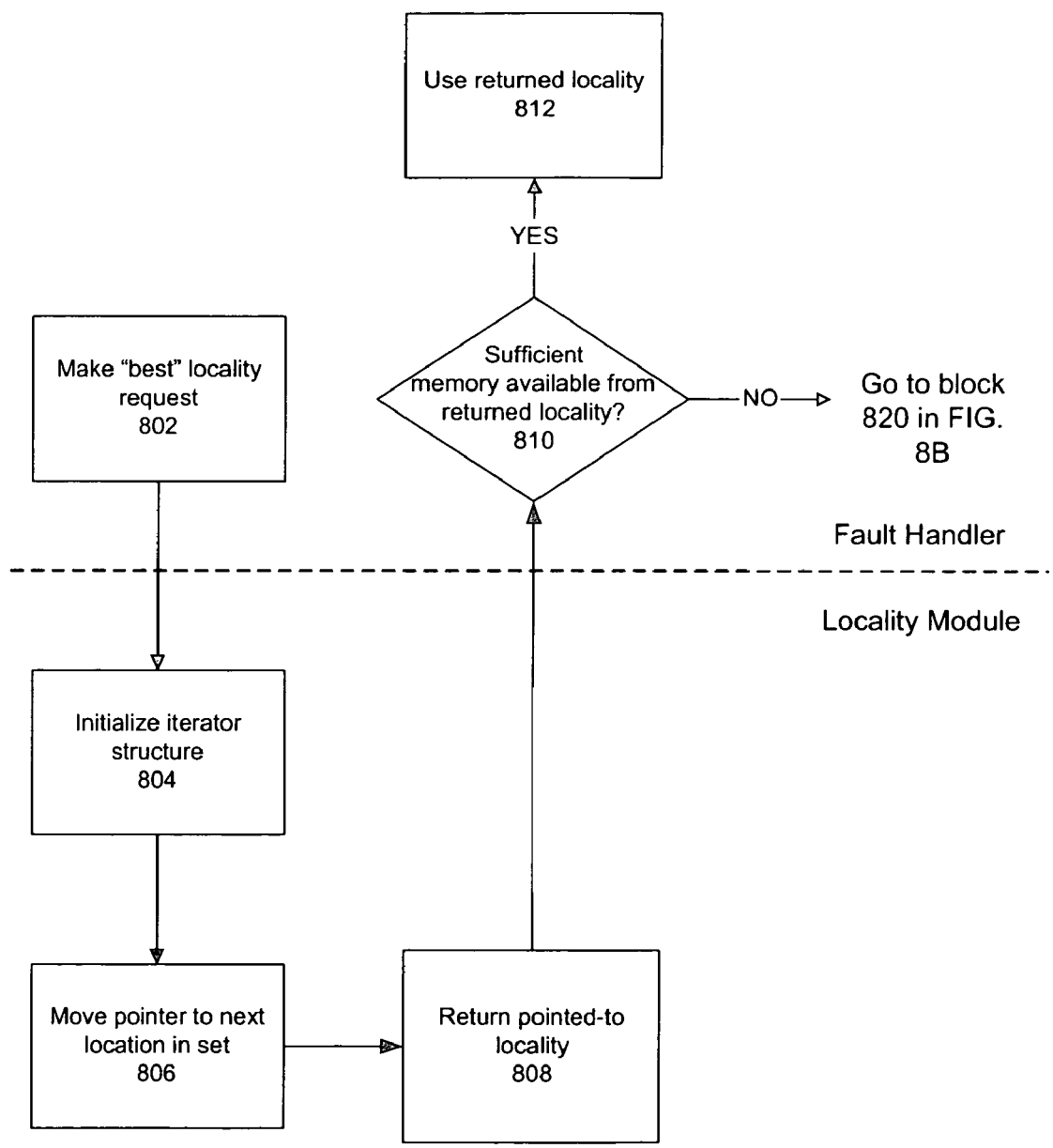
FIGS. 8A and 8B are flow charts depicting a method of locality selection by a VM locality module in accordance with an embodiment of the invention.
Figure 8B:
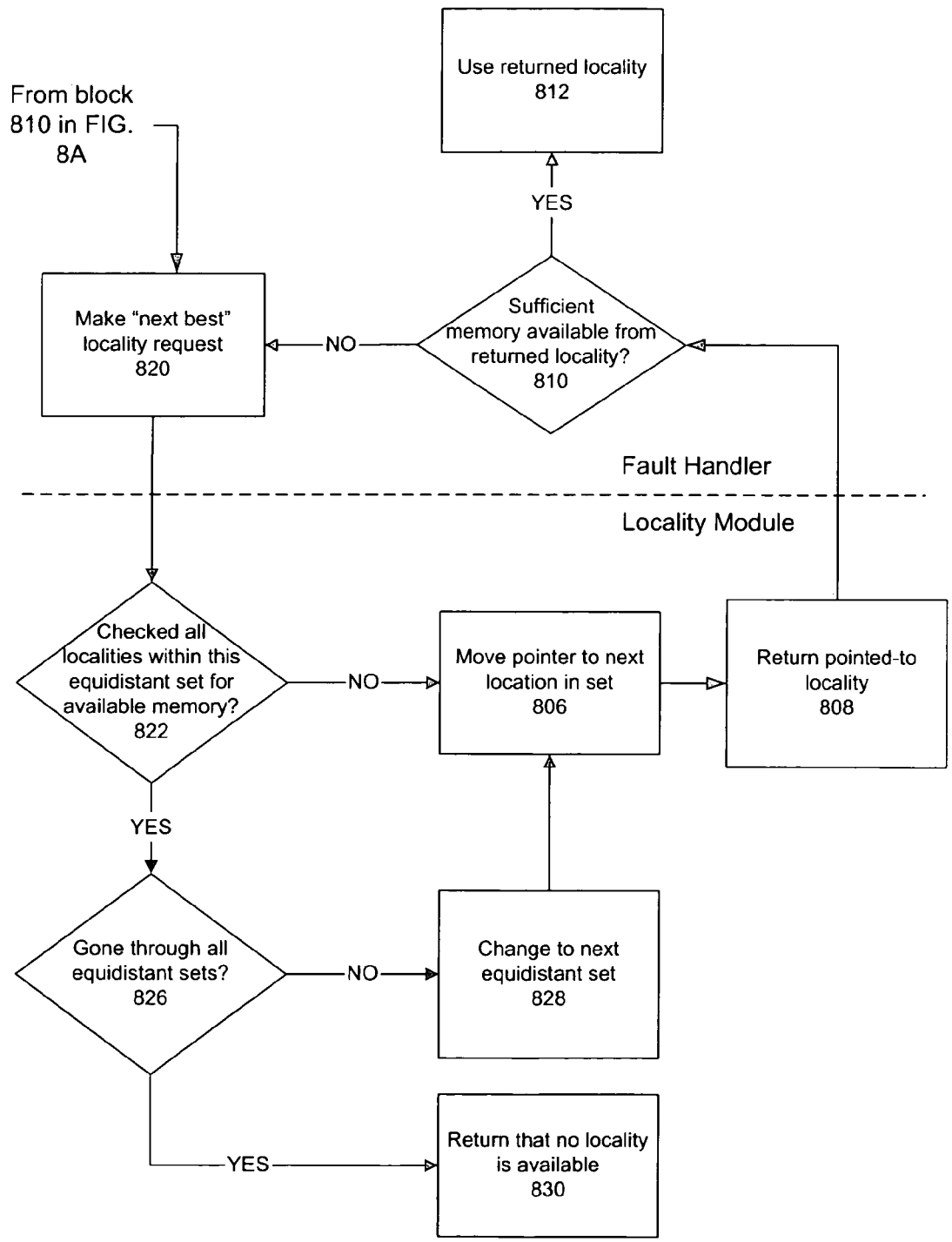

FIGS. 8A and 8B are flow charts depicting a method 800 of locality selection by a VM locality module 408 in accordance with an embodiment of the invention. The method 800 comprises a "get best," then "get next best" iterator paradigm.

The method 800 begins when the VM fault handler 406 makes 802 a "get best" call (i.e. a "best" locality request) to the VM locality module 408. In response, the VM locality module 408 proceeds by initializing 804 the appropriate iterator structure for the system. This initialization includes recording a first equidistant set and a current locality being pointed to within that set. For example, if the initialized iterator structure were the iterator structure 600 of FIG. 6, then the initial locality pointed to would comprise the interleaved memory locality 604. (In other words, the iterator structure 600 is set to be in the state associated with the interleaved memory locality 604.) As another example, if the initialized iterator structure were the iterator structure 700 of FIG. 7, then the initial locality pointed to would comprise the local memory at Node 2 704. Next, the VM locality module 408 moves 806 the pointer (or "marker") to a next location in the current set of equidistant localities in the iterator structure. The pointed-to locality is then returned 808 by the locality module 408 to the fault handler 406. The VM fault handler 406 proceeds to determine 810 whether there is sufficient memory available from the returned locality. If there is sufficient memory available, then that locality is used 812. If there is insufficient memory available, then the method 800 goes to block 820 in FIG. 8B.

Per FIG. 8B, the fault handler 406 makes 820 a get "next best" call (i.e. "next best" locality request) to the locality module 408. In response, the locality module 408 makes a further determination 822 as to whether all localities within the present equidistant set have been checked for available memory.

If other localities within the present set remain to be checked for sufficient memory, then the pointer is moved 806 to the next locality in the current set and the pointed-to locality is returned 808 from the locality module 408 to the fault handler 406. The fault handler 406 proceeds to determine 810 whether there is sufficient memory available from the returned locality. If there is sufficient memory available, then that locality is used 812. If there is insufficient memory available, then the method 800 loops back to block 820 in FIG. 8B.

If all localities within the present set have been checked and none have sufficient memory, then a further determination 826 is made as to whether all of the equidistant sets in the iterator structure have been gone through. If other equidistant sets remain, then the VM locality module 408 changes 828 to the next equidistant set. Thereafter, a locality within this set is pointed to 824 and the pointed-to locality is returned 808 from the locality module 408 to the fault handler 406. On the other hand, if no other equidistant sets remain, then the VM locality module 408 returns 830 an indication that no locality is available or that none was found.

"Interleaved First" Example:

Now consider a specific example using the system 100 of FIG. 1 and an "interleaved first" search policy. In this example, the VM fault handler 406 makes 802 a "get best" call, including the indication of the interleaved first policy, to the VM locality module 408. In response, the VM locality module 408 initializes 804 the iterator structure 600 as depicted in FIG. 6 and moves 806 the pointer to the interleaved memory 604 as the initial locality within the first equidistant set 602 of the iterator structure 600. Then, the interleaved memory locality 604 is returned 808 by the locality module 408 to the fault handler 406. Thereafter, the VM fault handler 406 checks 810 whether there is sufficient memory available from the interleaved memory 304 so as to make the allocation.

First, consider that, in this instance, there is sufficient memory available in interleaved memory 304. In that case, the VM fault handler 406 uses the interleaved memory locality and may allocate memory therefrom. In response to subsequent get "best" calls, the VM locality module 408 continues to return 808 the interleaved memory locality until there is no longer sufficient memory available therein.

Next consider that there is insufficient memory available in interleaved memory 304. In this case, the VM fault handler 406 makes 820 a "next best" request to the VM locality module 408. In response, since no other equivalent localities are in the first set 602, the VM locality module 408 makes a further determination 826 as to whether all of the equidistant sets in the iterator structure 600 have been gone through. Here, other equidistant sets remain, so the VM locality module 408 changes 828 to the second equidistant set 606. The pointer may then be moved to local memory at Node 0 608-0 (in this example), and this pointed-to locality 608-0 may be returned 808. The fault handler 406 then performs to the sufficient available memory verification step 810. Here, let us assume that there is sufficient local memory available at Node 0. In that case, the fault handler 406 uses 812 that local memory at Node 0 for memory allocation. In response to a subsequent get "best" call, the pointer would be moved 806 to local memory at Node 1 608-1, and that locality 608-1 would be returned. And so on. This rotation of the pointer serves to implement the round-robin policy within the second set 606.

"Closest First" Example:

Now consider a specific example using the system 200 of FIG. 2 and a "closest first" search policy. In this example, the fault handler 406 makes 802 a "get best" call, including the indication of the closest first policy and Node 2 as the requesting or designated node, the VM locality module 408 initializes 804 the iterator structure 700 as depicted in FIG. 7 and moves 806 the pointer to the local memory of Node 2 704 as initial locality within the first equidistant set 702 of the iterator structure 700. Then, the local memory of Node 2 704 is returned 808 by the locality module 408 to the fault handler 406. Thereafter, the VM fault handler 406 checks 810 whether there is sufficient memory available from the local memory of Node 2 704 so as to make the allocation. Let us assume that, in this instance, there is sufficient memory available in the local memory 302 at Node 2. In that case, the fault handler 408 uses 812 the Node 2 locality for allocation of memory. In response to subsequent get "best" calls, the VM locality module 408 continues to return 808 the Node 2 locality 704 until there is no longer sufficient memory available therein.

Next consider that there is insufficient memory available in the local memory 302 at Node 2. In this case, the VM fault handler 406 makes 820 a "next best" request to the VM locality module 408. In response, since no other equivalent localities are in the first set 702, the VM locality module 408 makes a further determination 826 as to whether all of the equidistant sets in the iterator structure 700 have been gone through. Here, other equidistant sets remain, so the VM locality module 408 changes 828 to the second equidistant set 706. The pointer may then be moved to local memory at Node 0 708-0 (in this example), and this pointed-to locality 708-0 may be returned 808. The fault handler 406 then performs to the sufficient available memory verification step 810. Here, let us assume that there is sufficient local memory available at Node 0. In that case, the fault handler 406 uses 812 that local memory at Node 0 for memory allocation. In response to a subsequent get "best" call, the pointer would be moved 806 to local memory at Node 1 708-1, and that locality 708-1 would be returned. In response to yet another get "best" call, the pointer would be moved 806 to local memory at Node 3 708-3, and that locality 708-3 would be returned. This rotation of the pointer serves to implement the round-robin policy within the second set 706. And so on.

There are various advantages of the system and method disclosed above. One advantage is that searching for the "next best" locality to allocate memory is performed very rapidly. To achieve that end, the special locality structures are built at initialization time to assist in the rapid allocation. The special locality structures or lists include the equidistant locality sets and the equidistant locality elements (states) therein. The sets and elements are joined together as discussed above and shown in FIGS. 6 and 7. In accordance with an embodiment of the invention, all the elements in a set are at a same access "distance" in relation to a starting locality. The elements within a set may be arranged in a circular list. The first set in the overall structure holds the fastest localities from which to allocate memory. The next set holds the next fastest localities, and so on. The next element in the set from which to attempt an allocation is indicated by a pointer to that element. After an element is accessed, the pointer may shift to a next element in the set so as to implement a round-robin type allocation policy. With such allocation, equidistant localities are each searched for available memory in a round-robin fashion. Hence, equidistant localities are treated fairly. This advantageously distributes memory accesses evenly across the equidistant localities and makes it unlikely that one locality will run out of memory long before other localities. Another plus is that interleaved memory is advantageously integrated into the memory ordering, search parameters, and internal lists. Moreover, because the pointer will always point to only one element, no locking is required to access this shared structure. Finally, the technique disclosed herein is advantageously scalable to large systems.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A method of rapidly selecting a physical memory locality in response to a memory fault event to accomplish efficient memory allocation in a multiprocessor system which includes a plurality of cells and shared memory distributed across the cells, wherein each cell includes at least a portion of the shared memory, the method comprising:
    receiving from a requesting processor in one of said cells a request to access a virtual memory address;
    checking for a translation of said virtual memory address to a corresponding physical address; and
    if said translation is not found, then performing steps of:
    sending a locality request to a virtual memory fault handler, the locality request including an indication of a search policy to use from among a plurality of search policies;
    forming a data structure based on physical memory localities at the cells within the system and the search policy that was indicated, said data structure including sets of equidistant physical memory localities from said requesting processor; and
    selecting a preferred physical memory locality using a pointer to a locality within said data structure.

2. The method of claim 1, wherein the physical memory localities include local memories at the cells in the system.

3. The method of claim 2, wherein the plurality of search policies includes a "closest first" policy.

4. The method of claim 2, wherein the physical memory localities further includes interleaved memory in the system.

5. The method of claim 4, wherein the plurality of search policies further includes an "interleaved first" type of policy.

6. The method of claim 1, wherein the selection of the preferred locality is performed using a get "best"/"next best" iteration procedure.

7. The method of claim 1, wherein the determination of the preferred locality includes changing to a next equidistant set if there is no memory available in any locality of a current equidistant set.

8. The method of claim 7, further comprising returning an indication that no locality is available if no locality within any of the equidistant sets has sufficient memory.

9. The method of claim 1, wherein the pointer is rotated amongst localities within a current equidistant set so as to provide for round-robin type selection amongst those equidistant physical memory localities.

10. A multiprocessor computing system, the system comprising:
    multiple symmetric multiprocessing (SMP) nodes;
    multiple central processing units (CPUs) at each SMP node;
    a memory control unit at each SMP node which is coupled to each CPU at that SMP node;
    shared memory at each SMP node which is accessible by way of the memory control unit at that SMP node;
    a switching system coupled to the memory control units so as to interconnect the multiple SMP nodes;
    an operating system running on the CPUs;
    a virtual memory (VM) fault handler within the operating system; and
    a VM locality module within the operating system,
    wherein the operating system is configured to:
        receive from a requesting CPU in one of said SMP nodes a request to access a virtual memory address;
        check for a translation of said virtual memory address to a corresponding physical address; and
        if said translation is not found, then the operating system is configured to:
            send a locality request to the VM fault handler, the locality request including an indication of a search policy to use from among a plurality of search policies;
            form a data structure based on physical memory localities at the SMP nodes within the system and the search policy that was indicated, said data structure including sets of equidistant physical memory localities from said requesting CPU; and select a preferred physical memory locality using a pointer to a locality within said data structure.

11. The system of claim 10, wherein the shared memory includes both local memory and interleaved memory, and wherein the plurality of search policies include at least a closest first search policy and an interleaved first search policy.

12. The system of claim 11, wherein the data structure for the closest first search policy comprises a first set including a closest local memory locality and one or more other sets of equidistant localities.

13. The system of claim 12, wherein the other sets include an interleaved memory locality.

14. The system of claim 11, wherein the data structure for the interleaved first search policy comprises a first set including an interleaved memory locality and a set including local memory localities.

15. The system of claim 10, wherein the VM locality module is further configured to determine a preferred locality using a pointer to a locality within the data structure.

16. A multiprocessor computing system configured so as to rapidly select physical memory localities to accomplish efficient memory allocation, the multiprocessor computing system comprising an operating system which includes:

a virtual memory manager configured for extending a memory space beyond limits of a physical address space;

a virtual memory fault handler configured to interrupt execution of the virtual memory manager when a page fault occurs; and a virtual memory locality module configured to receive a locality request from the virtual memory fault handler, to form a data structure having sets of equidistant physical memory based on a search policy indicated in the locality request, and to rapidly select a physical memory locality in the system using a pointer to the data structure;

wherein the virtual memory manager is configured to:

receive from a requesting processor a request to access a virtual memory address;

check for a translation of said virtual memory address to a corresponding physical address; and if said translation is not found, then the virtual memory manager is configured to:

send a locality request to the virtual memory fault handler, the locality request including an indication of a search policy to use from among a plurality of search policies;

form a data structure based on physical memory localities within the multiprocessor computing system and the search policy that was indicated, said data structure including sets of equidistant physical memory localities from said requesting processor; and select a preferred physical memory locality using a pointer to a locality within said data structure.

* * * * *